United States Patent [19]

Corley

[11] Patent Number: 4,554,342

[45] Date of Patent: Nov. 19, 1985

[54] HEAT-CURABLE COMPOSITIONS COMPRISING AN EPOXY RESIN, AN AMINE AND A SULFONIUM SALT

[75] Inventor: Larry S. Corley, Houston, Tex.

[73] Assignee: Shell Oil Company, Houston, Tex.

[21] Appl. No.: 635,984

[22] Filed: Jul. 30, 1984

[51] Int. Cl.[4] ............ C08G 59/56; C08G 59/68
[52] U.S. Cl. .................... 528/90; 525/504; 528/89; 528/391; 528/407
[58] Field of Search .............. 528/89, 90, 407, 391; 525/504

[56] References Cited

U.S. PATENT DOCUMENTS

| 4,173,476 | 11/1979 | Smith et al. | 528/90 X |
| 4,230,814 | 10/1980 | Crivello | 528/90 X |
| 4,241,204 | 12/1980 | Crivello | 528/90 X |
| 4,259,454 | 3/1981 | Crivello | 528/90 X |
| 4,318,766 | 3/1982 | Smith | 204/159.23 X |

*Primary Examiner*—Earl Nielsen

[57] ABSTRACT

Heat-curable compositions exhibiting improved thermal pot life are obtained from epoxy compositions comprising (1) a polyepoxide, (2) an aromatic or aliphatic amine and (3) a trihydrocarbyl sulfonium salt.

19 Claims, No Drawings

HEAT-CURABLE COMPOSITIONS COMPRISING AN EPOXY RESIN, AN AMINE AND A SULFONIUM SALT

FIELD OF THE INVENTION

The present invention is directed to amine-cured epoxy resins in the presence of certain trialkylsulfonium salts of anions of low nucleophilicity.

BACKGROUND OF THE INVENTION

A large number of curing agents are known for epoxy resins, as, for example, amines, anhydrides, mercaptans, etc. Each curing agent has advantages and disadvantages that make it acceptable or unusable for some applications. Also, each curing agent, or combination thereof, may be employed with one or more curing accelerators. Examples include the inorganic and organic metal salts such as lithium chloride and stannous octoate; onium salts such as ammonium chloride, alkyl phosphonium halides, etc; and $BF_3$ complexes.

There is a need to develop curable epoxy resin compositions which cure very rapidly at moderately elevated temperatures have very long pot life at room temperature.

Accordingly, it has now been disclosed that certain trialkylsulfonium salts containing anions of low nucleophilicity function as excellent accelerators for the amine cure of epoxy resins. These accelerators are much more thermally latent than prior art accelerators such as $BF_3$ complexes and give a much longer room temperature pot life at equivalent 150° C. gel time.

Summary of the Invention

The present invention is directed to heat-curable epoxy resin compositions exhibiting improved thermal latency and pot life, which when cured, yield compositions exhibiting improved physical properties. More particularly, the invention provides a heat-curable composition comprising (1) a polyepoxide, (2) curing amount of an amine, especially an aromatic amine, and (3) a catalytic amount of a trihydrocarbyl sulfonium salt, particularly a trialkyl sulfonium salt containing an anion of low nucleophilicity. These compositions are especially suitable for use in sheet molding compositions (SMC), in structural applications such as automotive parts, oil well parts (sucker rods), as well as in resin transfer molding (RTM) applications.

DESCRIPTION OF THE PREFERRED EMBODIMENTS

It has now been found that heat-curable compositions exhibiting improved thermal latency are obtained from epoxy compositions comprising (1) a polyepoxide, (2) an aromatic (or possibly aliphatic) amine and (3) a trialkyl sulfonium salt.

Accordingly, the present invention comprises (1) a polyepoxide, especially a liquid polyepoxide, (2) a curing amount of an aromatic or aliphatic amine or blend thereof and (3) a catalytic amount of a trialkyl sulfonium salt.

Preferably, the composition comprises (1) a glycidyl polyether of a polyhydric phenol, (2) from about 0.5 to about 1.5 chemical equivalents of an aromatic or aliphatic amine based on the glycidyl polyether and (3) a catalytic amount of a trialkyl sulfonium salt, preferably from about 0.001% to about 10% by weight of the glycidyl polyether.

Polyepoxides

The polyepoxides used to prepare the present compositions comprise those compounds containing at least one vicinal epoxy group; i.e., at least one

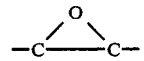

group. These polyepoxides may be saturated or unsaturated, aliphatic, cycloaliphatic, aromatic or heterocyclic and may be substituted if desired with non-interfering substitutents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. No. 3,356,624, U.S. Pat. No. 3,408,219, U.S. Pat. No. 3,446,762, and U.S. Pat. No. 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more propertly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)-propane, sometimes called the diglycidyl ethers of 2,2-bis(4-cyclohexanol)propane.

Other examples of suitable polyepoxides include the glycidyl ethers of novolac resins, i.e., phenol-aldehyde condensates. Preferred resins of this type are those disclosed in U.S. Pat. No. 2,658,885.

For most applications it is desirable to utilize an epoxy resin which is liquid or semi-liquid under the conditions of application. Accordingly, a blend of a liquid and solid epoxy resin may be employed. For some applications, a solid resin may be employed.

Amines

Suitable aromatic amines include, among others, methylenedianiline, metaphenylenediamine, 2,4-bis[p-aminobenzyl]aniline, diaminodiphenyl sulfone, 2,4-toluenediamine, 1,3-diamino-2,4-diethyl-6-methylbenzene, 4,4'-oxydianiline, methylenebis(ortho-chloroaniline), 2,6-diaminopyridine, 4-bromo-1,3-diaminobenzene, etc. Aliphatic amines such as bis(4-aminocyclohexyl)methane, 1,3-diamino-p-methane, or 1,2-diaminocyclohexane may also be used, although aromatic amines constitute a preferred class.

In general, a curing amount of amine is used. Operable amounts range from about 0.5 to about 2.0 chemical equivalents of amine to epoxy resin, with from about 0.75 to 1.25 being preferred. As used herein, a chemical equivalent amount is the amount to furnish one amino hydrogen per epoxy group.

Trialkylsulfonium Salts

In general, the trialkylsulfonium salts containing anions of low nucleophilicity are preferred. Suitable tri(-hydrocarbyl)sulfonium salts have the following general formula:

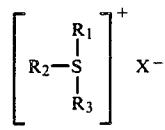

wherein $R_1$, $R_2$, and $R_3$ each represent the same or different alkyl or aryl radicals of from about 1 to about 18 carbon atoms; and X is selected from the group: $BF_4$, $PF_6$, $AsF_6$, $SbF_6$, $CF_3SO_3$, $FSO_3$, $CH_3SO_3$, 2,4,6-trinitrobenzenesulfonate, p-toluenesulfonate, etc. The alkyl or aryl radicals $R_1$, $R_2$ and $R_3$ may contain various substituents such as oxygen, sulfur, halogens, etc.

Suitable triorgano-sulfonium salts include, among others, triethylsulfonium tetrafluoroborate, methyldiphenylsulfonium tetrafluoroborate, ethyldiphenylsulfonium tetrafluoroborate, allylidimethylsulfonium tetrafluoroborate, allyl bis(2-(allyloxy)ethyl)-sulfonium tetrafluoroborate, trimethylsulfonium hexafluorophosphate, ethyl(2-hydroxyethyl)(2-(ethylthio)ethyl)sulfonium tetrafluoroborate, etc.

Briefly, these triorgano-sulfonium salts can be prepared by a number of processes. One process involves reaction of a sulfonium halide with the silver salt of a nonnucleophilic anion such as tetrafluoroborate. In a second process, an alcohol such as allyl alcohol, a sulfide such as dimethyl sulfide, and an acid such as tetrafluoroboric acid containing an anion of low nucleophilicity, are mixed and refluxed. Water is removed by azeotropic distillation and entrained in a Dean-Stark trap and the sulfonium salt is left in the pot (in this case, allylidimethylsulfonium tetrafluoroborate). In a third process, a β-hydroxyalkyl sulfide, such as 2,2'-thiodiethanol, is mixed with an acid containing an ion of low nucleophilicity and water is removed by vacuum distillation, leaving a sulfonium salt mixture.

The present compositions may be prepared by simply adding and mixing the essential components. Other components customarily added include fillers, reinforcement fibers, pigments, flame retardant agents, plasticizers, stabilizers, extenders, thixotropic agents, antioxidants, and the like.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or cloth and the material formed into the desired object and cured.

The following examples are given to illustrate the preparation of the instant heat-curable thermosetting compositions. It is understood tha the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis(4-hydroxyphenyl)propane having an epoxide equivalent weight of 175–190 and an average molecular weight of about 360.

Epoxy Resin B is a liquid glycidyl polyether of 2,2-bis(4-hydroxyphenyl)propane having an epoxide equivalent weight of 180–195 and an average molecular weight of about 380.

EPON CURING AGENT® Y is a liquid aromatic amine having an amine nitrogen content of 14–16% by weight and a viscosity (25° C.) of 15–35 poises, containing about 30% by weight of o-toluenediamine and 70% by weight of a isomeric mixture of polymethylene polyanilines.

EXAMPLE 1

Preparation of a BF3-accelerated version of EPON CURING AGENT® Y

EPON CURING AGENT Y (300 g) was heated to 60°-70° C. Boron trifluoride diethyl etherate (4.8 g) was added to the molten EPON CURING AGENT Y in a fume hood. At this point there was release of copious quantities of diethyl ether vapor; a precipitate formed on the surface of the aromatic amine mixture. The mixture was held at 60°-70° C. with occasional shaking until all the precipitate had dissolved.

EXAMPLE 2

Reaction of 2,2-Thiodiethanol with 48% Aqueous HBF$_4$ 6200 g (50 moles) of 98.5% 2,2'-thiodiethanol was mixed with 4580 g (25 equivalents) of 48% aqueous tetrafluoroboric acid. This mixture was held in a 5-gallon polyethylene reservoir. A glass wiped-film evaporator with an evaporative surface area of 323 cm$^2$ was set up with a Teflon intake tube leading to the polyethylene reservoir; intake rate was controlled by a metering valve. The evaporative surface was held at a temperature of 95°-98° C., while water was pumped from an ice bath to cool the condensation surface. The pressure in the evaporator was lowered to 40-130 Pa and the thiodiethanol-tetrafluoroboric acid mixture was introduced slowly. Water was evaporated from the mixture leaving the desired reaction product as the residue. The intake rate was regulated to give a product output rate of 10-12 mL/min. Karl Fischer titration of the product (sulfonium salt mixture) showed a water level of 2.5% in the product.

EXAMPLE 3

Use of BF$_3$ and Product of Example 2 as Accelerators of Epoxy Cure by EPON CURING AGENT Y Epoxy Resin A, EPON CURING AGENT Y, and the products of Examples 1 and 2 were combined at room temperature in polyethylene beakers and mixed thoroughly with Jiffy mixers. The proportions of resin, curing agent and accelerator used are given in Table 1.

A portion of each reaction mixture was transferred to a jar of approximately 150 mL capacity and held at 25° C. Brookfield viscosity was determined periodically on each mixture.

Another portion of each mixture was poured into a mold made of glass plates held ⅛" (3.2 mm) apart with a polytetrafluoroethylene spacer to make a sheet casting. Another portion of each mixture was poured into aluminum molds containing a linear cavity ½" (12.7 mm) square to form bar castings. The sheet and bar molds were placed in an oven and held for two hours at 80° C., and two hours at 150° C. The sheet and bar castings were then removed from the molds and tested for mechanical properties. Mechanical properties are given in Table 1.

From Table 1 one can see that the mixtures accelerated with BF$_3$ (in the curing agent from Example 1) and with the reaction product of Example 2 are similar in 150° C. gel time (as determined on a gel plate). Both are much shorter in gel time than the control mixture (mixture 3 in Table 1). Mixture 1 (containing the reaction product from Example 2) however, shows a much slower rate of viscosity increase at 25° C. than does Mixture 2, which contains the BF$_3$-accelerated curing agent prepared in Example 1. The slower viscosity increase represents a longer working life for the material at room temperature. The mechanical properties determined for all the castings are very similar (Table 1).

TABLE 1

| THIODIETHANOL-HBF$_4$ REACTION PRODUCT VERSUS BF$_3$ DIETHYL ETHERATE AS ACCELERATORS FOR EPOXY RESIN A CURE BY EPON CURING AGENT® Y | | | |
|---|---|---|---|
| | MIXTURE # | | |
| | 1 | 2 | 3 |
| Composition: | | | |
| Epoxy Resin A, parts | 100 | 100 | 100 |
| EPON® Curing Agent Y, parts | 25 | | 25 |
| Product of Example 2, parts | 1 | | |
| Product of Example 1, parts | | 25 | |
| Processing-related properties: | | | |
| 150° C. gel time, sec. | 85.8 | 84.4 | 485.7 |
| Elapsed time at 25° C. min.- | 22–6.10,102–8.16 | 17–4.96,98–11.82 | 15–5.46,97–6.16 |
| 25° C. Brookfield viscosity, Pa · s | 190–13.9,262–20.8, 337–40.24,462–176.4 | 188–2080,260–solid | 187–7.40,252–8.22, 327–10.10,452–12.36 |
| 25° C. pot life, min. (time to doubling of viscosity) | 175 | 90 | 370 |
| Cured casting properties: | | | |
| Heat distortion temperature, °C. ASTM D-648 | 154,155 | 154,155 | 154 |
| Tg, °C., dynamic mechanical (Rheometrics) | 170 | 170 | 170 |
| R.T. Tensile Strength, MPa, ASTM D-638 | 76.4 | 59.9 | 83.4 |
| R.T. Tensile Modulus, MPa, ASTM D-638 | 3160 | 3160 | 2790 |
| R.T. Tensile Elongation, %, ASTM D-638 | 4.81 | 3.04 | 6.17 |
| 149° C. Tensile Strength, MPa, ASTM D-638 | 12 | 13 | 12 |
| 149° C. Tensile Modulus, MPa, ASTM D-638 | 800 | 930 | 860 |
| 149° C. Tensile Elongation, %, ASTM D-638 | 6.89 | 7.68 | 13.0 |

EXAMPLE 4

Reaction of 2-(Ethylthio)ethanol with 48% Aqueous HBF$_4$ 6372 g (60 moles) of 2-(ethylthio)ethanol was mixed with 5487 g (30 equivalents) of 48% aqueous tetrafluoroboric acid. This mixture was held in a 5-gallon polyethylene reservoir. A glass wiped-film evaporator was set up under evaporation conditions identical to those in Example 2. The feed intake rate was regulated to give a product output rate of 5-15 mL/min. Karl Fischer titration showed a water level of 2.5% in the product. Plasma emission spectrometry gave boron levels in the product of 4.2 and 4.3 weight percent. The $^{13}C$ NMR spectrum of the product in acetone-$d_6$ was consistent with a structure of

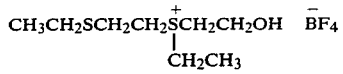

for 72% of the product, with the product apparently containing 2% of 2-(ethylthio)ethanol and 26% of other components of unknown structure.

EXAMPLE 5

Use of the Product of Example 4 as an Accelerator for Epoxy Cure by Bis(4-aminocyclohexyl)methane A mixture of 20 g of Epoxy Resin B and 5.74 g of bis(4-aminocyclohexyl)methane was prepared in a plastic beaker and hand-stirred. This mixture gelled in 79 seconds in a thin layer on a 150° C. gel plate. A second mixture was prepared identical to the first except for the addition of 0.4 g of the product of Example 4. This second mixture gelled in 29 seconds in a thin layer on a 150° C. gel plate.

What is claimed is:

1. A curable composition consisting essentially of (a) a polyepoxide, (b) at least one aromatic or aliphatic amine present in an amount effective to cure the polyepoxide under curing conditions, and (c) a catalytic amount of a trihydrocarbyl sulfonium salt comprising substituted or unsubstituted alkyl or aryl radicals.

2. The composition of claim 1 wherein the polyepoxide is a glycidyl polyether of a polyhydric phenol.

3. The composition of claim 2 wherein the polyhydric phenol is 2,2bis(4-hydroxyphenyl)propane.

4. The composition of claim 1 wherein the trihydrocarbyl sulfonium salt is a trialkyl sulfonium salt.

5. The composition of claim 4 wherein the trialkyl sulfonium salt is used in an amount from about 0.001% to about 10% by weight of the polyepoxide.

6. The composition of claim 1 wherein the trihydrocarbyl sulfonium salt is a mixture prepared by the condensation of 2,2'-thiodiethanol with tetrafluoroboric acid.

7. The composition of claim 1 wherein the trihydrocarbyl sulfonium salt is ethyl(2-hydroxyethyl)(2-(ethylthio)ethyl)sulfonium tetrafluoroborate.

8. The composition of claim 1 wherein the aromatic amine is 4,4'-methylenedianiline.

9. A composition consisting essentially of: (a) a polyepoxide, (b) an aromatic or aliphatic amine present in an amount of from about 0.5 to about 2.0 chemical equivalents based on the polyepoxide, and (c) a trihydrocarbyl sulfonium salt comprising substituted or unsubstituted alkyl or aryl radicals and present in an amount of about 0.001 to about 10 weight percent based on the weight of the polyepoxide.

10. The composition of claim 9 wherein the amine is present in an amount of from about 0.5 to about 1.5 chemical equivalents based on the polyepoxide.

11. The composition of claim 9 wherein the amine is selected from the group consisting of methylenedianiline, metaphenylenediamine, 2,4-bis[p-aminobenzyl]aniline, diaminodiphenyl sulfone, 2,4-toluenediamine, 1,3-diamino-2,4-diethyl-6-methylbenzene, 4,4'-oxydianiline, methylenebis(ortho-chloroaniline), 2,6-diaminopyridine, 4-bromo-1,3-diaminobenzene, bis(4-aminocyclohexyl)methane, 1,8-diamino-p-menthane, 1,2-diaminocyclohexane and mixtures of these.

12. The composition of claim 9 in which the amine is present in an amount of from about 0.75 to about 1.25 equivalents of amine per equivalent of polyepoxy.

13. The composition of claim 9 which further contains at least one additive selected from the group consisting of a filler, reinforcement fibers, a pigment, a flame retardant, a plasticizer, a stabilizer, an extender, a thixotropic agent and an antioxidant.

14. The composition of claim 9 which further contains reinforcement fibers.

15. A method for extending the pot life of a heat-curable polyepoxide composition containing an amine curing agent comprising contacting the composition with a material consisting essentially of from about 0.5 to about 2.0 chemical equivalents of at least one substituted or unsubstituted trihydrocarbyl sulfonium salt.

16. The method of claim 15 in which the amine curing agent is selected from the group consisting of methylenedianiline, metaphenylenediamine, 2,4-bis[p-aminobenzyl]aniline, diaminodiphenyl sulfone, 2,4-toluenediamine, 1,3-diamino-2,4-diethyl-6-methylbenzene, 4,4'-oxydianiline, methylenebis(ortho-chloroaniline), 2,6-diaminopyridine, 4-bromo-1,3-diaminobenzene, bis(4-aminocyclohexyl)methane, 1,8-diamino-p-menthane, 1,2-diaminocyclohexane and mixtures of these.

17. The method of claim 15 in which the trihydrocarbyl sulfonium salt is a mixture prepared by the condensation of 2,2-thiodiethanol with tetrafluoroboric acid.

18. The method of claim 16 in which the composition further contains reinforcement fibers.

19. The method of claim 16 in which the trihydrocarbyl sulfonium salt can be represented by the formula

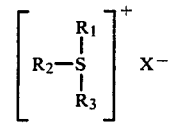

wherein $R_1$, $R_2$ and $R_3$ are selected independently from substituted or unsubstituted alkyl and aryl radicals having 1 to about 18 carbon atoms and X is selected from the group consisting of $BF_4$, $PF_6$, $AsF_6$, $CF_3SO_3$, $FSO_3$, $CH_3SO_3$, 2,4,6-trinitrobenzenesulfonate and p-toluenesulfonate.

* * * * *